United States Patent [19]
Kim

[11] Patent Number: 5,239,246
[45] Date of Patent: Aug. 24, 1993

[54] FORCE REFLECTION WITH COMPLIANCE CONTROL

[75] Inventor: Won S. Kim, Northridge, Calif.

[73] Assignee: The United States of America as represented by the Administrator of the National Aeronautics and Space Administration, Washington, D.C.

[21] Appl. No.: 912,955

[22] Filed: Jul. 8, 1992

[51] Int. Cl.$^5$ .................... B25J 9/18; G05B 19/19
[52] U.S. Cl. .................... 318/568.11; 318/560; 318/568.21; 318/568.17; 318/568.12; 901/9; 901/19
[58] Field of Search ............ 318/560, 568.12, 568.11, 318/568.16, 568.17, 568.21; 901/9, 19

[56] References Cited

U.S. PATENT DOCUMENTS

| | | | |
|---|---|---|---|
| 4,791,588 | 12/1988 | Onda et al. | 364/513 |
| 4,808,063 | 2/1989 | Haley | 414/730 |
| 4,925,312 | 5/1990 | Onaga et al. | 364/513 |
| 4,985,668 | 1/1991 | Nakazumi et al. | 318/568.2 |
| 5,012,591 | 5/1991 | Asakawa | 33/832 |
| 5,072,361 | 12/1991 | Davis et al. | 364/167.01 |
| 5,116,180 | 5/1992 | Fung et al. | 414/5 |

OTHER PUBLICATIONS

A. K. Bejczy, Z. Szakaly and W. S. Kim, "A Laboratory Breadboard System for Dual-Arm Teleoperation," Third Annual Workshop on Space Operations Automation and Robotics (Soar '89), pp. 649–660, NASA Johnson Space Center, Houston, Tex., Jul., 1989.

W. S. Kim, B. Hannaford and A. K. Bejczy, "Force-Reflection & Shared Compliant Control in Operating Telemanipulators with Time Delay," IEEE Trans. on Robotics and Automation, vol. 8, No. 2, pp. 176–185, Apr., 1992.

W. S. Kim, P. G. Backes, S. Hayati and E. Bokor, "Orbital Replacement Unit Changeout Experiments with a Telerobot Testbed System,"]IEEE Int. Conf. on Robotics and Automation, pp. 2026–2031, Sacramento, Calif., Apr., 1991.

W. S. Kim and A. K. Bejczy, "A Stability Analysis of Shared Compliance Control," Japan–USA Symposium on Flexible Automation, pp. 567–572, Kyoto, Japan, Jul. 1990.

A. K. Bejczy, Z. Szakaly and T. Ohm, "Impact of End Effector Technology on Telemanipulation Performance," Third Annual Workshop on Space Operations Automation and Robotics (SOAR '89) NASA, Office of Management, Scientific and Technical Information Division, pp. 429–440, 1990.

D. A. McAffee, T. Ohm, "Teleoperator Subsystem/-Telerobot Demonstrator: Force Reflecting Hand Controller Equipment Manual," Jet Propulsion Laboratory, JPL D-5172, Jan. 1988.

*Primary Examiner*—William M. Shoop, Jr.
*Assistant Examiner*—Karen Masih
*Attorney, Agent, or Firm*—John H. Kusmiss; Thomas H. Jones; Guy M. Miller

[57] ABSTRACT

Two classes of systems for force-reflecting control that enable high force-reflection gain are presented: position-error-based force reflection and low-pass-filtered force reflection, both combined with shared compliance control. In the position-error-based class, the position error between the commanded and the actual position of a compliantly controlled robot is used to provide force reflection. In the low-pass-filtered force reflection class, the low-pass-filtered output of the compliance control is used to provide force reflection. The increase in force reflection gain can be more than 10-fold as compared to a conventional high-bandwidth pure force reflection system, when high compliance values are used for the compliance control.

4 Claims, 12 Drawing Sheets

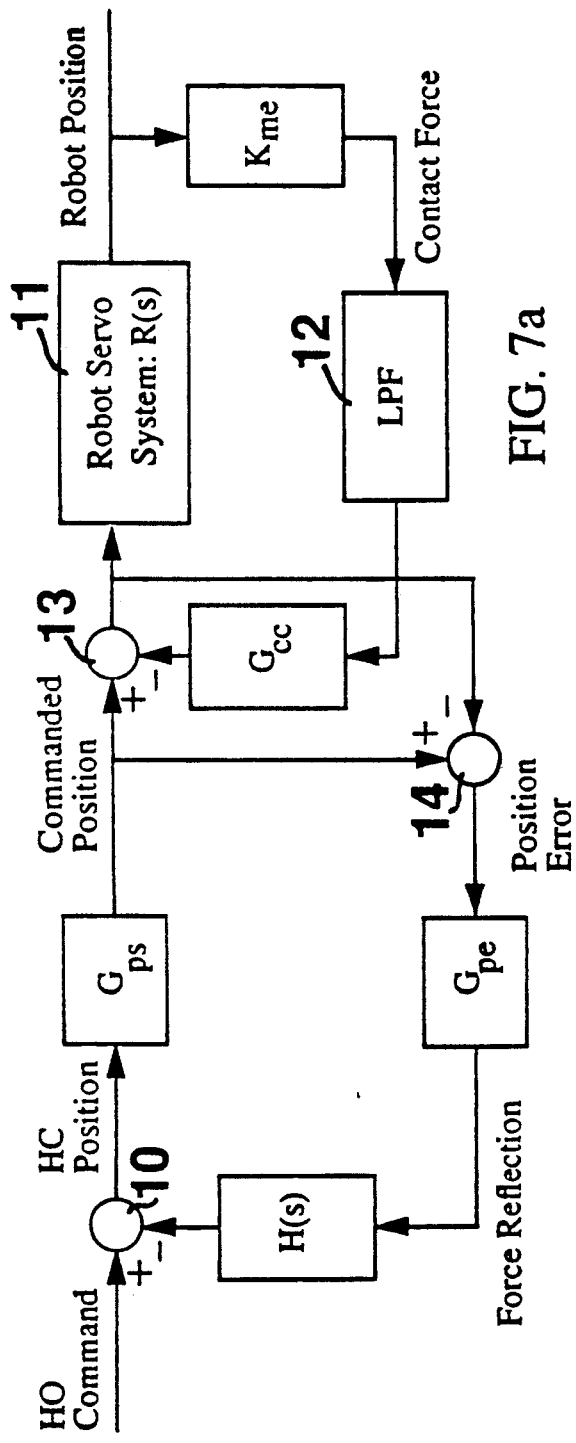
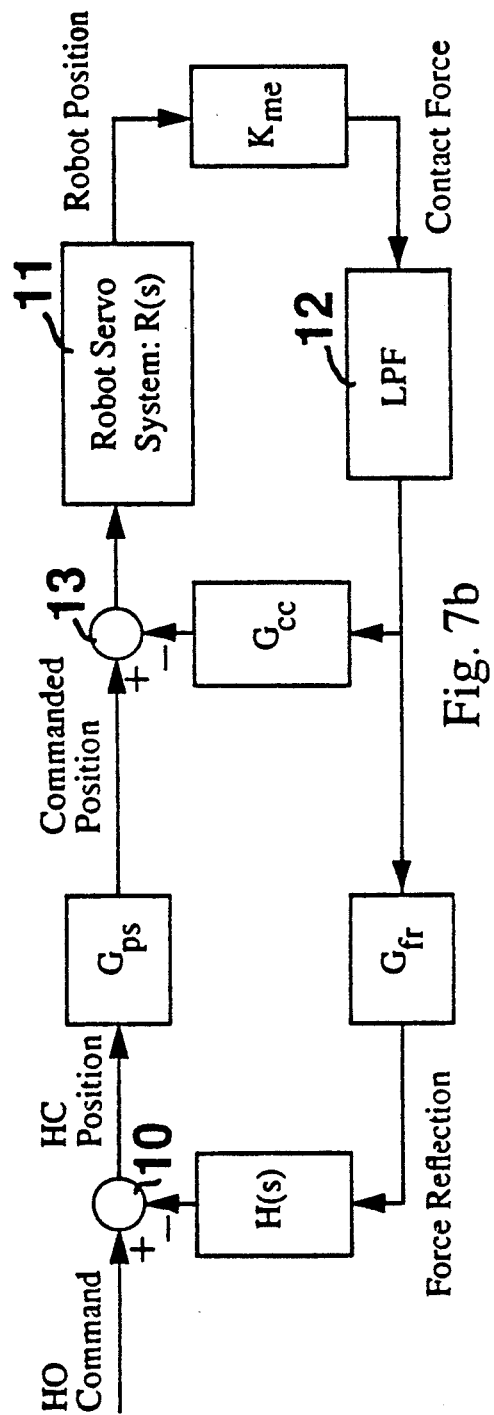
FIG. 7a
Fig. 7b

FORCE REFLECTION WITH COMPLIANCE CONTROL

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to teleoperation of a robot arm using a hand controller, and more particularly to force reflecting teleoperation combined with low-pass-filtered compliance control.

BACKGROUND ART

In a typical telemanipulation system that does not support force reflection or compliance control, a stiff remote manipulator moves strictly according to a human operator's position command, and small errors between the actual and the commanded position of the manipulator can give rise to undesired large contact forces and torques. It is thus hard to expect safe and reliable telemanipulation with this system.

Two major techniques that alleviate this excessive contact force problem are force reflection and shared compliance control. [A. K. Bejczy, Z. Szakaly and W. S. Kim, "A Laboratory Breadboard System for Dual-Arm Teleoperation," Third Annual Workshop on Space Operations Automation and Robotics (SOAR '89), pp. 649–660, NASA Johnson Space Center, Houston, Texas, July, 1989; and W. S. Kim, B. Hannaford and A. K. Bejczy, "Force-Reflection and Shared Compliant Control in Operating Telemanipulators with Time Delay," IEEE Trans. on Robotics and Automation, Vol. 8, No. 2, pp. 176–185, Apr. 1992]

In force reflecting teleoperation, the operator can feel contact forces and torques through a force reflecting hand controller and thus adjust the hand-controller position naturally to reduce undesired contact force components. Experimental studies indicate a significant enhancement in the human operator's task performance with force reflection. In shared compliance control, the operator's commanded position is altered by a compliant control force feedback in the robot side. This local autonomous force feedback in the robot side adds active compliance and damping to the stiff robot hand, making the robot more compliant to the environment and softening mechanical contacts/collisions between the manipulator and objects. Recent experiments demonstrated that shared compliance control is essential in time-delayed telemanipulation [Kim, et al., supra].

Recently, orbital replacement unit (ORU) change-out experiments were performed with the JPL/NASA telerobot testbed system [W. S. Kim, P. G. Backes, S. Hayati and E. Bokor, "Orbital Replacement Unit Change-out Experiments with a Telerobot Testbed System," IEEE Int. Conf. on Robotics and Automation, pp. 2026–2031, Sacramento, Calif., April, 1991], and the experimental results showed that without shared compliant control (SCC) or force reflection (FR), the operator could not complete the task, while with SCC or FR the operator could perform the task successfully with reduced contact forces both in magnitude and duration. The results also indicated that the task performance with SCC was superior to that with FR in terms of task completion time, cumulative contact force, and total contact duration. The relatively poor performance with FR was mainly due to a poor force reflection gain.

A major advantage of FR is that the operator actually feels the contact forces/torques sensed by the telerobot hand. However, the maximum FR gain attainable in this telerobot testbed system without causing instability has been approximately 1/10. With this low gain, the operator could feel only 1 lb when the manipulator hand senses a 10 lb contact force. The problem of poor force reflection is not specific to this testbed system, but rather inherent to the conventional FR control scheme being used for dissimilar master-slave systems where the slave system usually has much higher stiffness than the effective stiffness of the human hand holding the force reflecting hand controller.

In a typical force-reflecting telemanipulation system consisting of dissimilar master-slave arms, the position of a slave arm (remote manipulator) is controlled by the human operator command, HO, through a master arm force-reflecting hand controller 10 as shown in FIG. 1, while the contact forces/torques sensed by the force-/torque sensor of the robot servo system 11 at the base of the robot hand are reflected back to a human operator through the master arm of the hand controller 10. This forms a closed-loop system and raises a stability issue. Existing force-reflecting systems supporting dissimilar master-slave arms show that the force-reflection gain from the robot hand to the force reflecting hand controller is limited to approximately 1/10. This poor force reflection problem will now be discussed.

As a first-cut rough approximation, a linear decoupled system model in Cartesian axes is assumed. In FIG. 1, the open-loop transfer function Q(s) is given by $$Q(s) = G_{ps} G_{fr} K_{me} H(s) R(s), \quad (1)$$

where $G_{ps}$ is the position command scale factor, $G_{fr}$ is the force reflection gain, and $K_{me}$ is the effective stiffness which is a parallel combination of the manipulator stiffness and the environment stiffness. R(s) is the robot servo system transfer function in Cartesian space [W. S. Kim and A. K. Bejczy, "A Stability Analysis of Shared Compliance Control," Japan-U.S.A. Symp. on Flexible Automation, pp. 567–572, Kyoto, Japan, July 1990] and is given by a linear sum of the six second-order joint servo transfer functions with the DC gain of R(O)=1. R(s) could be second-order, fourth-order, or higher depending upon the Cartesian axis and the arm configuration. An example of a Cartesian space frequency response of the PUMA arm used in the Advanced Teleoperation System is shown in FIG. 2. In this example, the double-pole corner frequencies are at about 3 and 6 Hz, behaving as a fourth-order system. H(s) is the transfer function of the operator's hand holding the 6-degree-of-freedom force-reflecting hand controller [Bejczy, et al., supra]. The transfer function can be obtained by measuring the magnitude ratio of the hand controller deflection to the applied force input for different frequencies. Measurements indicate that the compliance value $C_h$ (=H(O)) varies from about 1.0–2.0 in/lb (0.5–1.0 lb/in stiffness) with a loose grasp to about 0.1–0.2 in/lb (5–10 lb/in stiffness) for a firm grasp. The bandwidth of H(s) is about 1 Hz for a loose grasp and 3 Hz for a firm grasp. Typical frequency responses of the operator's hand holding the force reflecting hand controller for firm grasp (circle) and for loose grasp (triangle) are shown in FIG. 3. In order to have a stable teleoperation system with a constant force reflection gain $G_{fr}$, the open-loop DC gain Q(O) should not be much greater than 1, since a higher-loop gain causes instability due to the higher-order dynamics of H(s)R(s). Namely, $$G_{fr} \leq \frac{1}{G_{ps}K_{me}C_h}. \qquad (2)$$

In a typical system, the combined stiffness of the manipulator and environment is measured $K_{me}=25$ lb/in, and it is assumed that the operator's hand can maintain at least a 2.5 lb/in stiffness (C=0.4 in/lb) during teleoperation. In this typical situation, the manipulator/environment stiffness is much higher than the operator's-hand/-hand-controller stiffness ($K_{me}C_h10$), and from Equation (2) the maximum force reflection gain $G_{fr}$ is limited to only 1/10 for the unity position scaling factor ($G_{ps}=1$). The foregoing analysis clearly indicates that the poor force reflection is not due to a poor implementation of the specific systems, but rather inherent to the existing conventional force-reflection system with dissimilar master/slave arms, when the bandwidth of the robot servo system dynamics R(s) is not substantially higher than 3 Hz which is the approximate bandwidth of the operator's hand dynamics with the hand controller H(s). A good direction to increase the force-reflection gain is to make the robot more compliant by employing compliant control.

Shared compliance control has been implemented in the prior art [Kim, Hannaford and Bejczy, supra] by low-pass filtering (LPF 12) the contact force (outputs of the force/torque sensor mounted on the base of the robot) and using these signals to alter the human operator's position/orientation command (HO/HC) received by the robot servo system 11 as shown in FIG. 4 using a mixer an adder/subtractor, hereinafter referred to as 13 which adds a negative force feedback signal to a positive HC position signal or subtracts the force feedback signal from the HC position signal if both are prepresented as positive or negative signals, as may sometimes be the case in digital signal systems as opposed to analog signal systems. This low-pass-filtered force/torque feed an effect of giving the robot hand behavior similar to a damped spring (in each of the task space dimensions) in series with the stiff, positioning-controlled, robot manipulator. An approximate mechanical equivalent of the above implementation consists of a spring connected in parallel with a damper. It can be shown that the compliance control force feedback gain $G_{cc}$ is approximately the new compliance value of the compliant robot control system of FIG. 4.

STATEMENT OF THE INVENTION

Two important developments related to FR are embodied in this invention: (i) new schemes of force reflecting control that make high force reflection possible for dissimilar master/slave arms, and (ii) assessment of the performance enhancement by providing the operator with both force reflection (FR) and shared compliance control (SCC). The results are two novel schemes of force reflecting control: position-error-based force reflection and low-pass-filtered force reflection. In the position-error-based scheme, the position error between the commanded and the actual position of a compliantly controlled robot is utilized to provide force reflection. In the low-pass-filtered force reflection scheme, the low-pass-filtered output of the compliance control is utilized. Both schemes enable unprecendently high force reflection gains of up to 2 with reduced bandwidth for dissimilar master/slave arms, when the unity position scale factor is used. The increase in force reflection gain can be more than 10-fold as compared to a conventional high-bandwidth pure force reflection system, when high compliance values are used for the compliance control. The two novel schemes of FR combined with SCC are described in detail below.

BRIEF DESCRIPTION OF THE DRAWINGS

FIG. 7a is a functional block diagram of a variation of the position-error-based force reflection with compliance control, and FIG. 7b shows its equivalent conversion resulting in low-pass-filtered force reflection with compliance control.

DETAILED DESCRIPTION OF THE INVENTION

Figure 1:
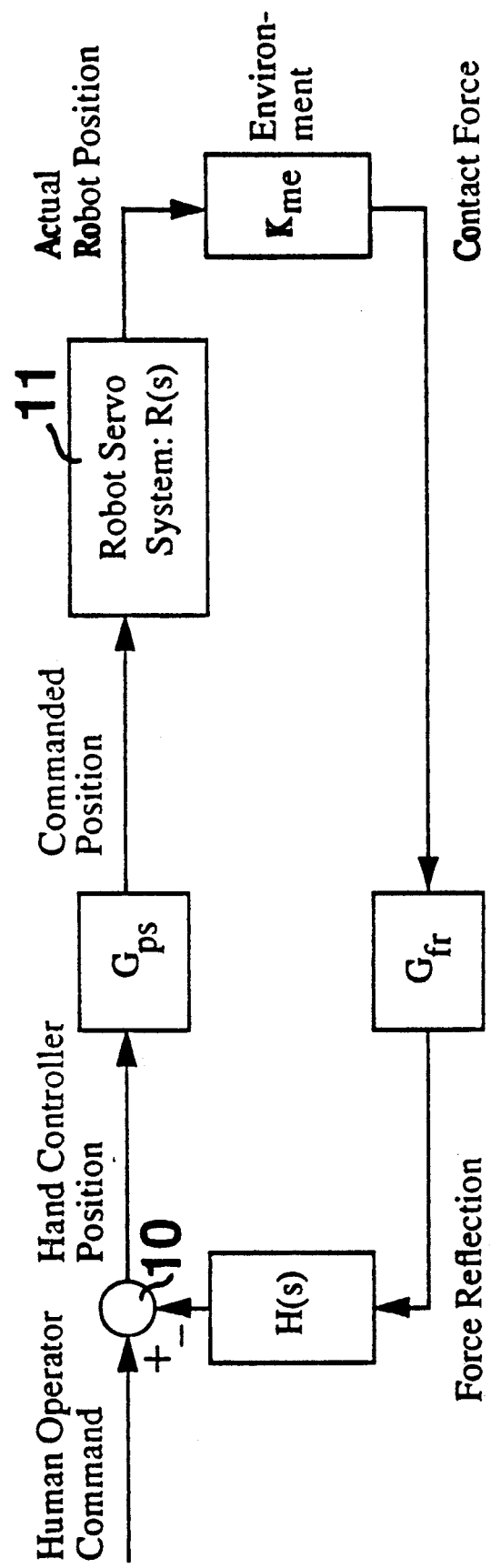
FIG. 1 is a functional block diagram of a typical prior-art force-reflecting scheme for dissimilar master-slave arms.
Figure 2:
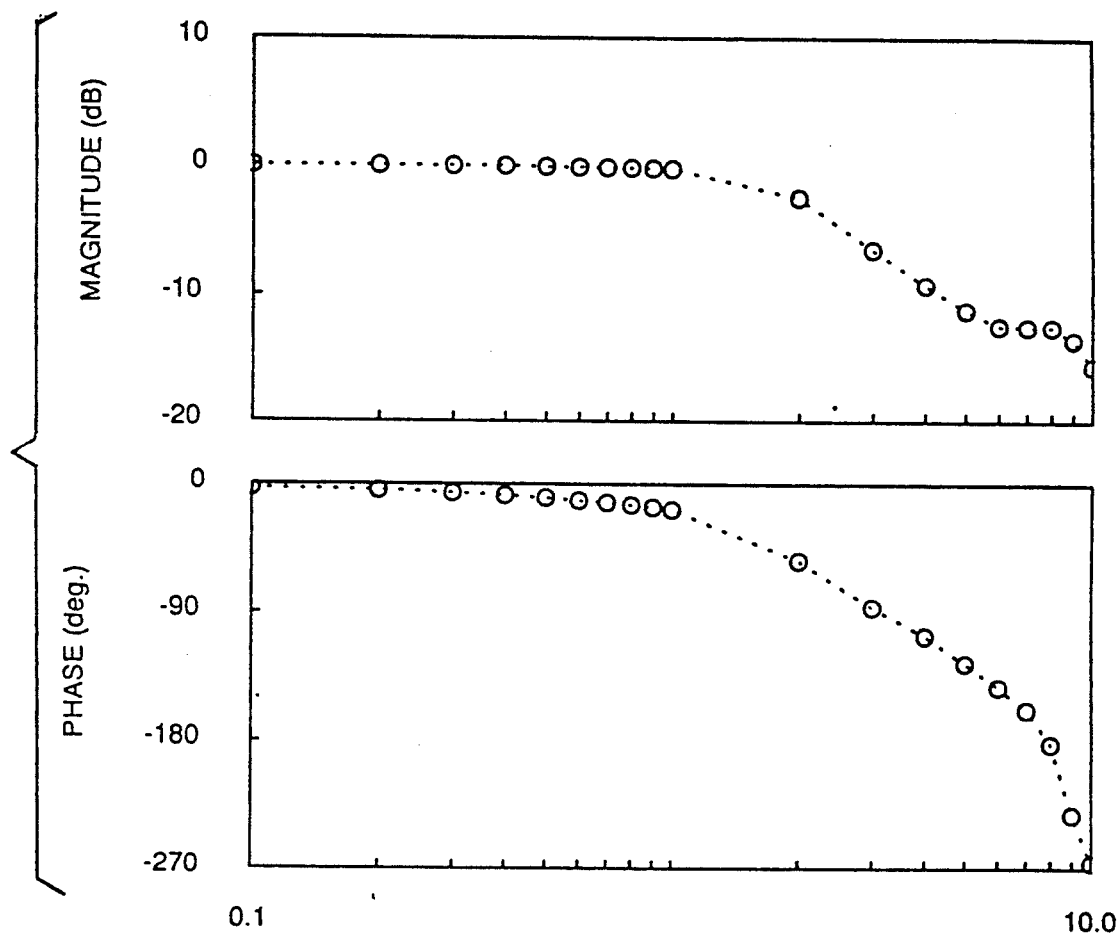
FIG. 2 are graphs showing typical Cartesian space frequency response in phase and magnitude of the PUMA arm used in the Advanced Teleoperation System.
Figure 3:
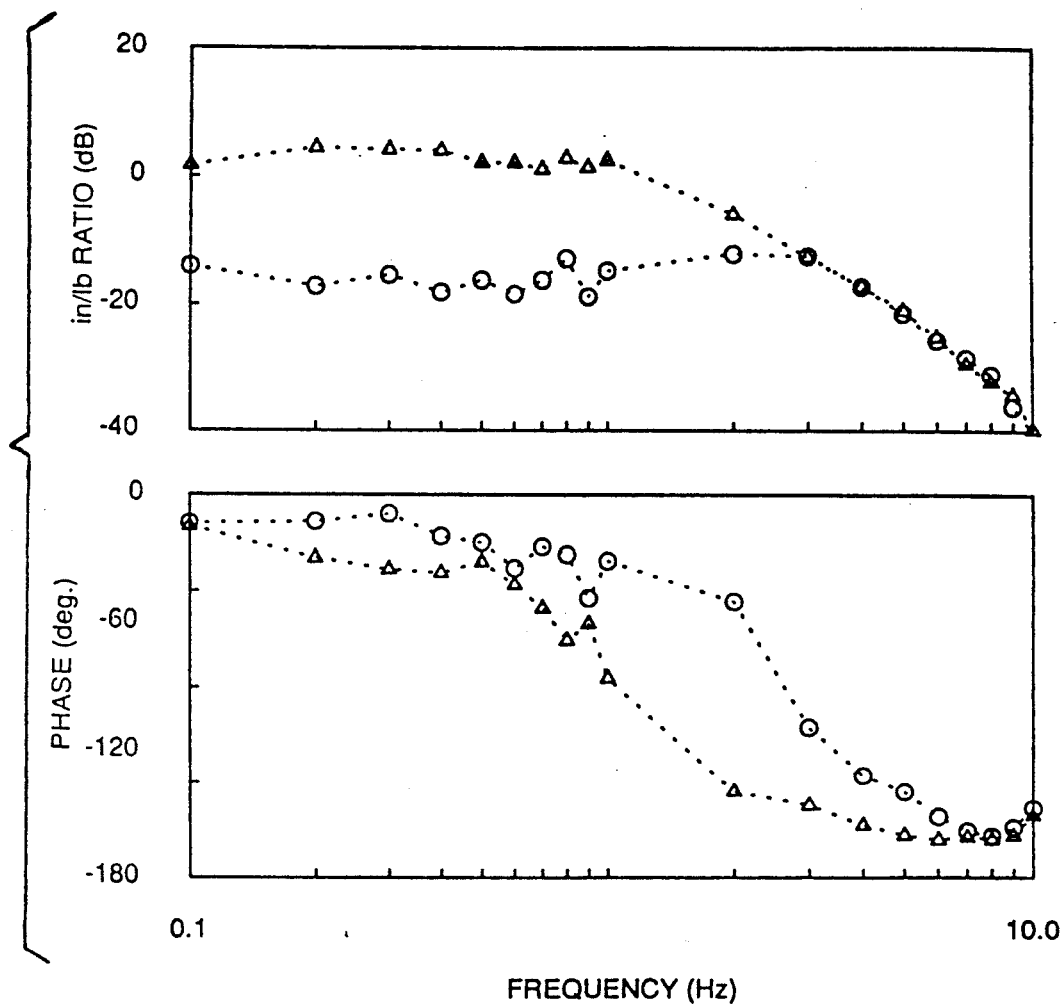
FIG. 3 are graphs showing typical frequency responses in phase and inch/lb ratio of an operator's hand holding a 6-axis force-reflecting hand controller for firm grasp (circle) and for loose grasp (triangle). The magnitude ratio of the hand-controller deflection to the applied force is plotted as a function of frequency.
Figure 5:
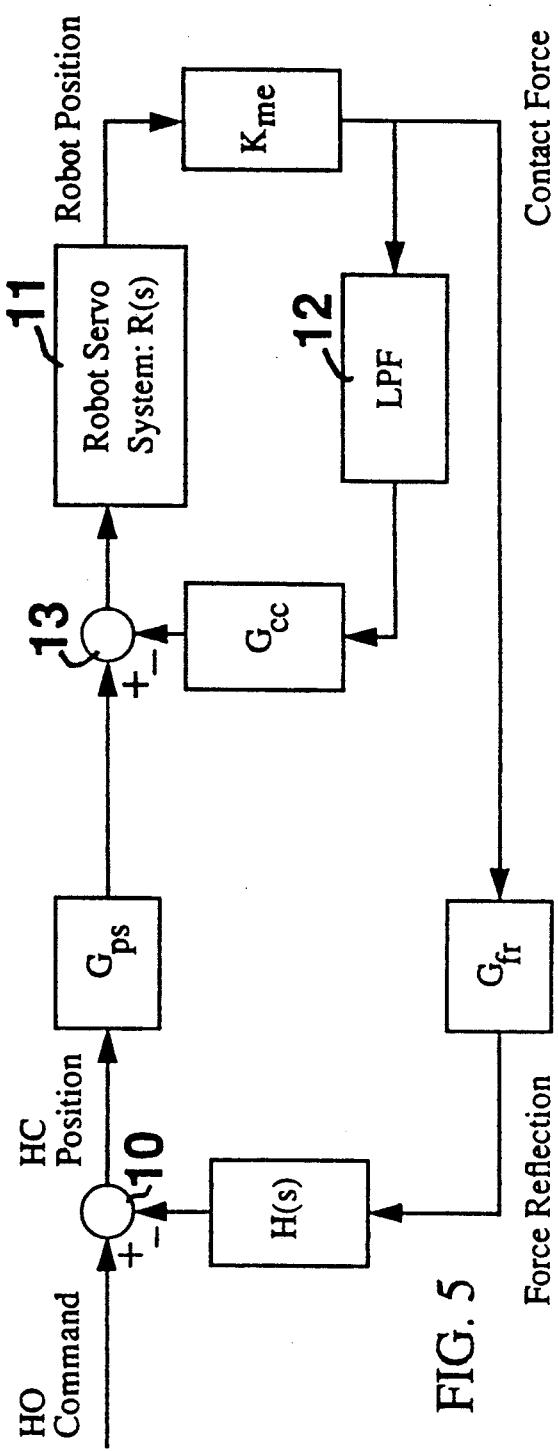
FIG. 5 is a functional block diagram of a simple combination of force reflection with shared compliance control. This scheme does not increase the force reflection gain noticeably.

A combination of force reflection (FR) with shared compliance control (SCC) as shown in FIG. 5 will now be described. This combination results in a system having two feedback loops; the inner compliance control loop residing in the robot side of the telemanipulation system and the outer force reflection loop with the operator in the loop. At first glance, one might think that the combination of SCC and FR of FIG. 5 should increase the force reflection gain GFR markedly, since the inner compliance control loop makes the manipulator/environment stiffness $K_{me}$ very low, approximately $1/G_{cc}$. Experimental testings, however, revealed that this combination increases the maximum force reflection gain only slightly. This can be understood by noting that the compliant control has a low-pass filter 12 whose bandwidth is lower than the manipulator bandwidth. As the frequency increases above the low-pass filter bandwidth, the effect of the inner compliant control loop diminishes resulting in the original model of FIG. 1, and thus in this scheme SCC does not contribute much to improve the force reflection gain.

Figure 6:
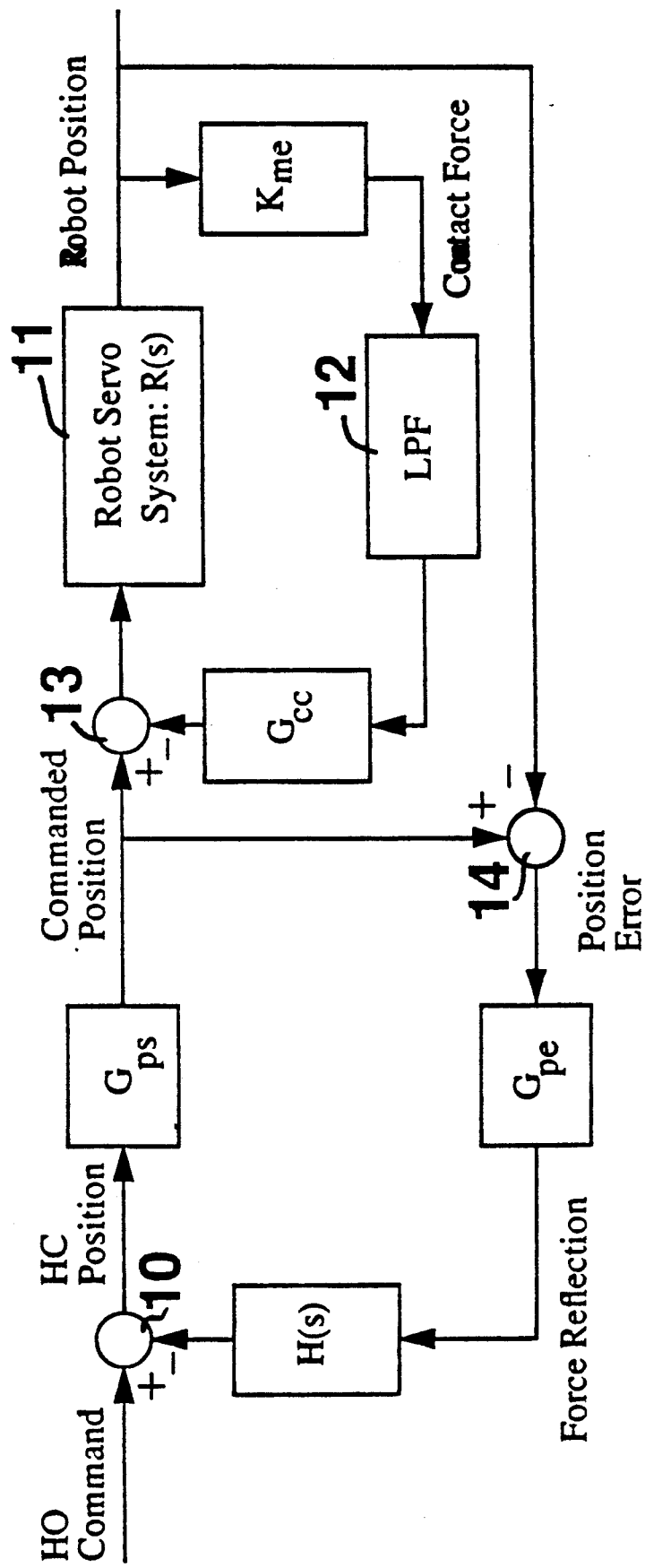
FIG. 6 is a functional block diagram of position-error-based force reflection with compliance control.

An alternate way of providing FR shown in FIG. 6 is to utilize the position difference from an error detector 14 between the commanded and the actual robot position. In that manner, force reflection is made proportional to the position error $\Delta x$, namely $f_{hc} = G_{pe}\Delta x$. Although this position-error-based force reflection technique has been widely used in replica master-slave arms as a standard approach to achieve the unity force reflection gain, its implementation to dissimilar master-slave arms resulted in poor force reflection, since the slave arm is usually much stiffer than the operator's hand holding the hand controller (master arm). A new scheme of force reflecting control that enables the system to have a sufficiently high force reflection gain (up to 2 or 3) for dissimilar master/slave arms is successfully provided by combining the position-error-based force reflection with compliance control as shown in FIG. 6. Compliance control is essential to achieve high force reflection gain.

In this scheme, the force reflection gain is given by $G_{pe}G_{cc}$, since the contact force $f_{rh}$ at the robot hand deflects the hand by $\Delta x = G_{cc}f_{rh}$, and the drive force of the force reflecting hand controller is then related to the robot contact force by $f_{hc} = G_{pe}\Delta x = G_{pe}G_{cc}f_{rh}$. It is interesting to observe that in this scheme the force/torque sensor outputs [A. K. Bejczy, Z. Szakaly and T. Ohm, "Impact of End Effector Technology on Telemanipulation Performance," Third Annual Workshop on Space Operations Automation and Robotics, (SOAR '89), National Aeronautics and Space Administration, Office of Management, Scientific and Technical Information Division, pp. 429-440, (1990)] are not directly used for force reflection. Instead, the force-torque sensor outputs are used for robot compliance control, while the position/orientation errors which are generated in proportion to robot compliances are used for force reflection.

A variation of the position-error-based force reflection has eventually led to an alternate scheme that also enabled the system to have high force reflection. By noting that the Cartesian-space transfer function of the robot servo system 11 for each Cartesian axis is close to 1 for low frequencies, $R(O)=1$ the control scheme of FIG. 6 is slight changed as shown in FIG. 7a, which can then be equivalently converted to FIG. 7b with $G_{fr}=G_{pe}G_{cc}$. This results in another new scheme of force reflecting control.

In this alternate scheme of FIG. 7b, low-pass-filtered contact forces, instead of pure uncompensated forces, are fed back to the operator. Note that simple combining of pure force reflection and compliance control (FIG. 5) does not allow high force reflection, while this new scheme enables the system to have high force reflection (up to 2 or 3) by using low-pass-filtered force reflection, instead of uncompensated pure constant gain force reflection, used in combination with compliance control.

The above two newly developed schemes of FIGS. 6 and 7b, namely position-error-based force reflection with compliance and low-pass-filtered force reflection with compliance, appear to be similar in characteristics and performance. In both schemes, high force reflection is achieved only with a limited bandwidth that is the same bandwidth imposed by the low-pass filter of the compliance control compensator. An interesting feature observed in the position-error-based force reflection is that the operator feels artificial force when the operator moves the hand controller faster than the actual robot motion.

Compliance, Force Reflection an Stability Measurements

Figure 8:
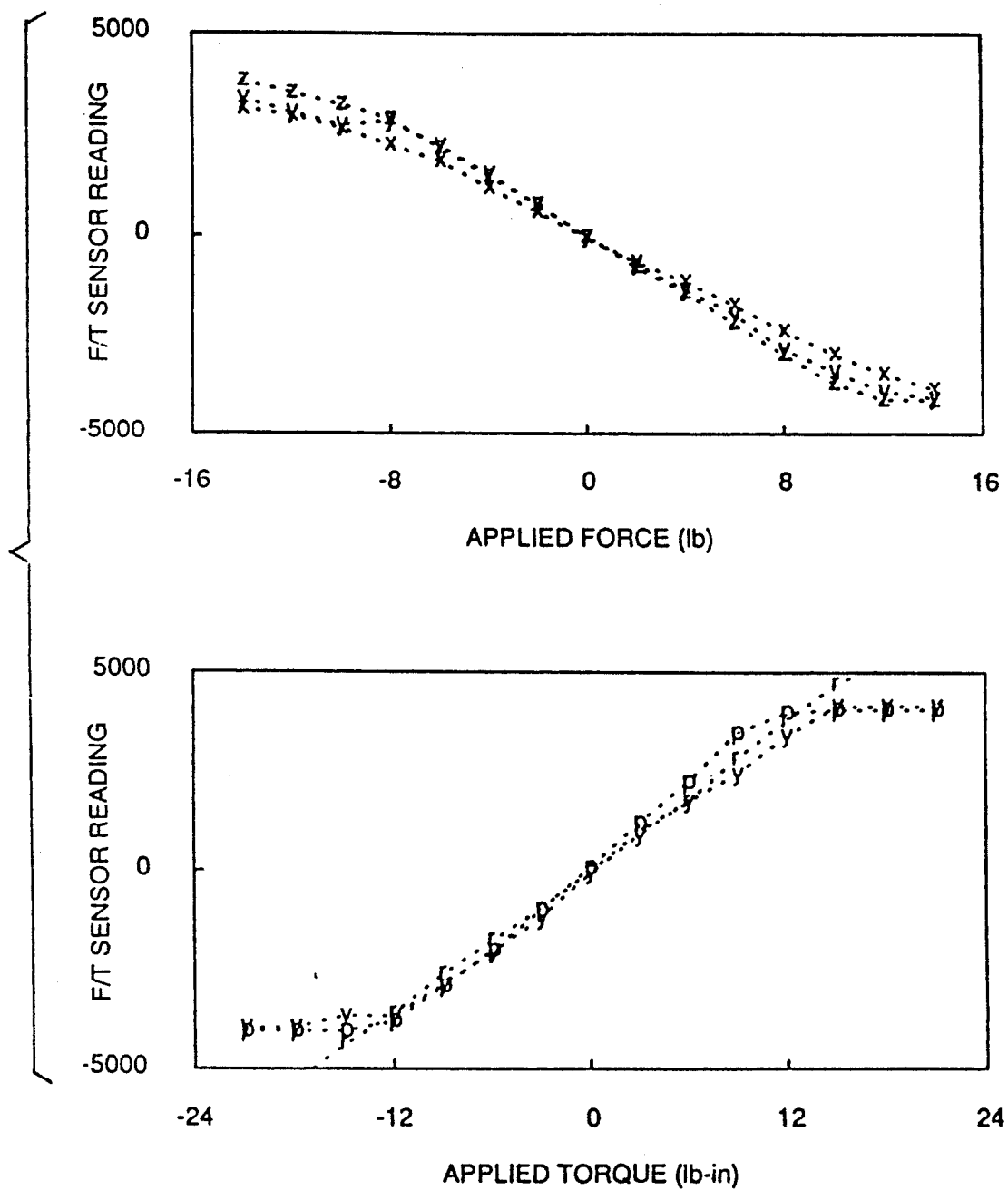
FIG. 8 are graphs which show digital readout vs. applied input force/torque measurements of the force/-torque sensor for x, y, z translations (upper) and for roll, pitch, yaw rotations (lower).
Figure 9:
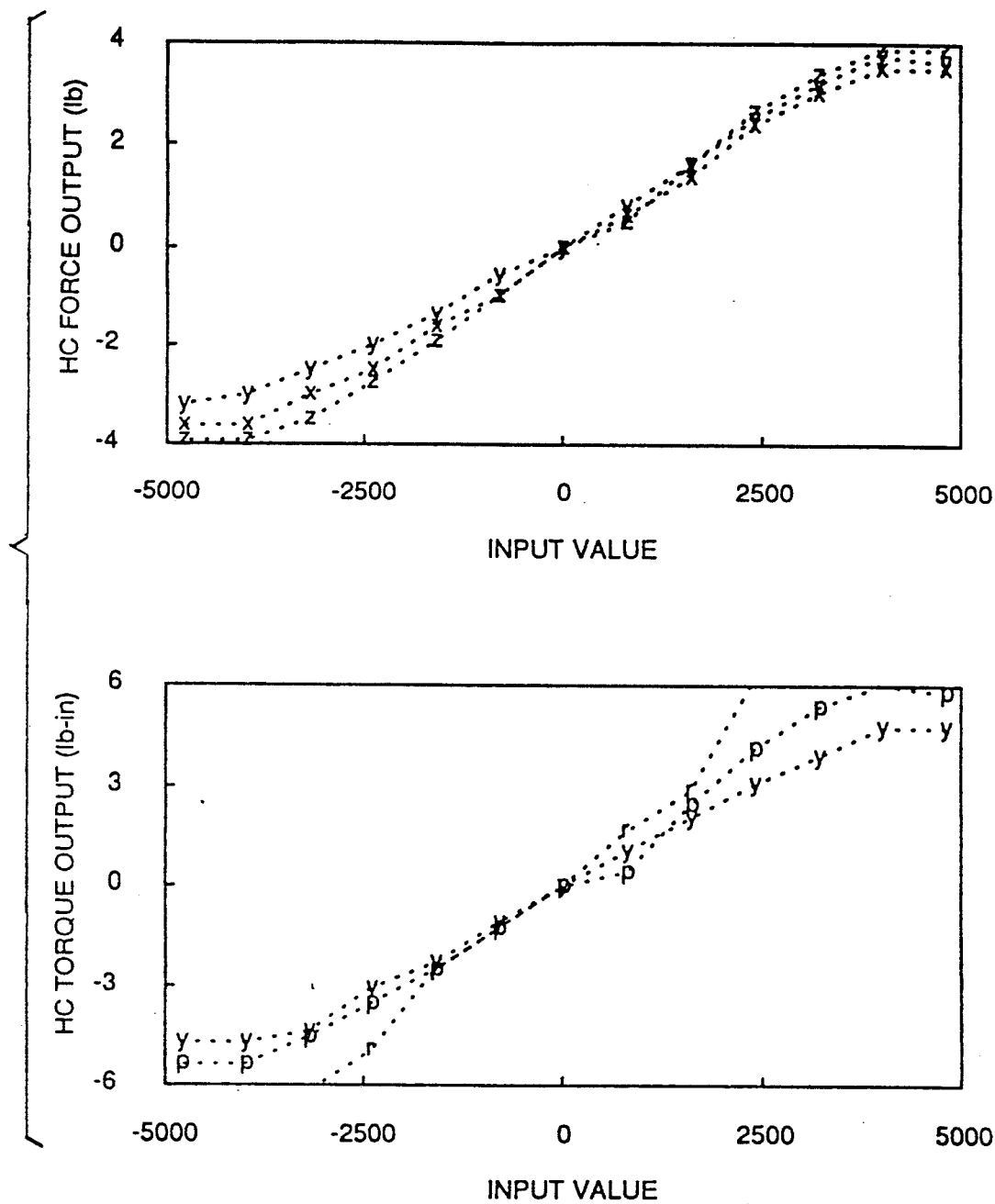
FIG. 9 are graphs which show force/torque output vs. digital input measurements of the force reflecting hand controller for x, y, z translations (upper) and for roll, pitch, yaw rotations (lower).

In order to characterize the force reflection and compliance behavior of the system, the force-input/digital-output characteristic of the force/torque sensor and the digital-input/force-output characteristic of the force reflecting hand controller were roughly measured manually by using a force gauge. Measurements indicate that the force/torque sensor reading is fairly linear up to ±10 lb for the x, y, z translations (FIG. 8, upper panel) and ±12 lb/in for the roll, pitch, yaw rotations (FIG. 8, lower). The force/torque drive behavior of the force reflecting hand controller is fairly linear up to about ±4 lb (FIG. 9, upper) for translations and about ±4 lb/in for rotations (FIG. 9, lower).

Figure 4:
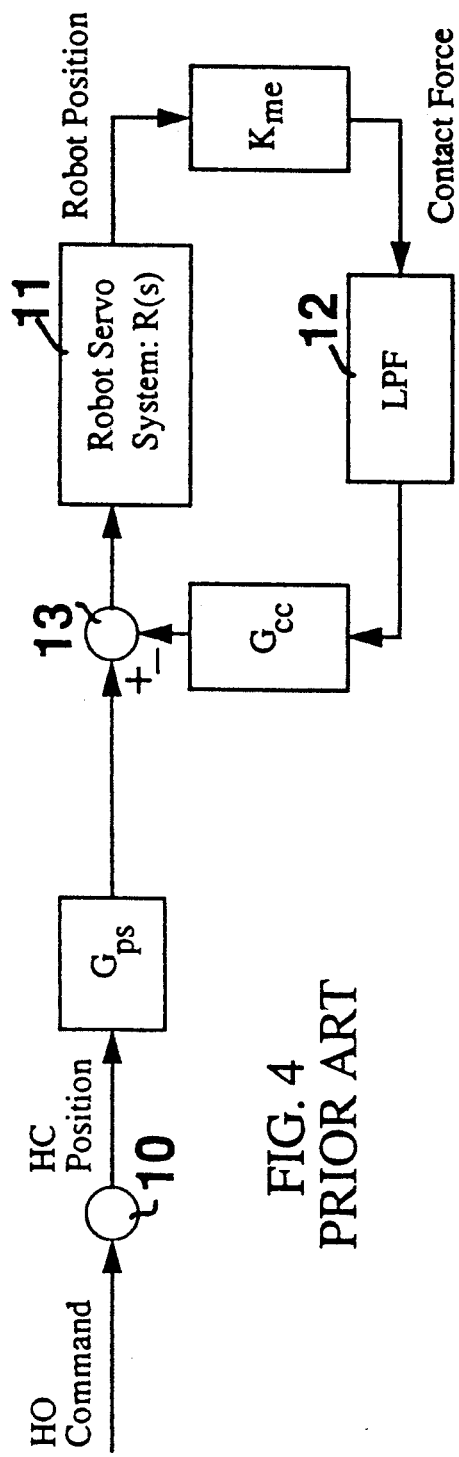
FIG. 4 is a functional block diagram of prior-art shared compliance control implementation with low-pass-filtered force/torque feedback.
Figure 10:
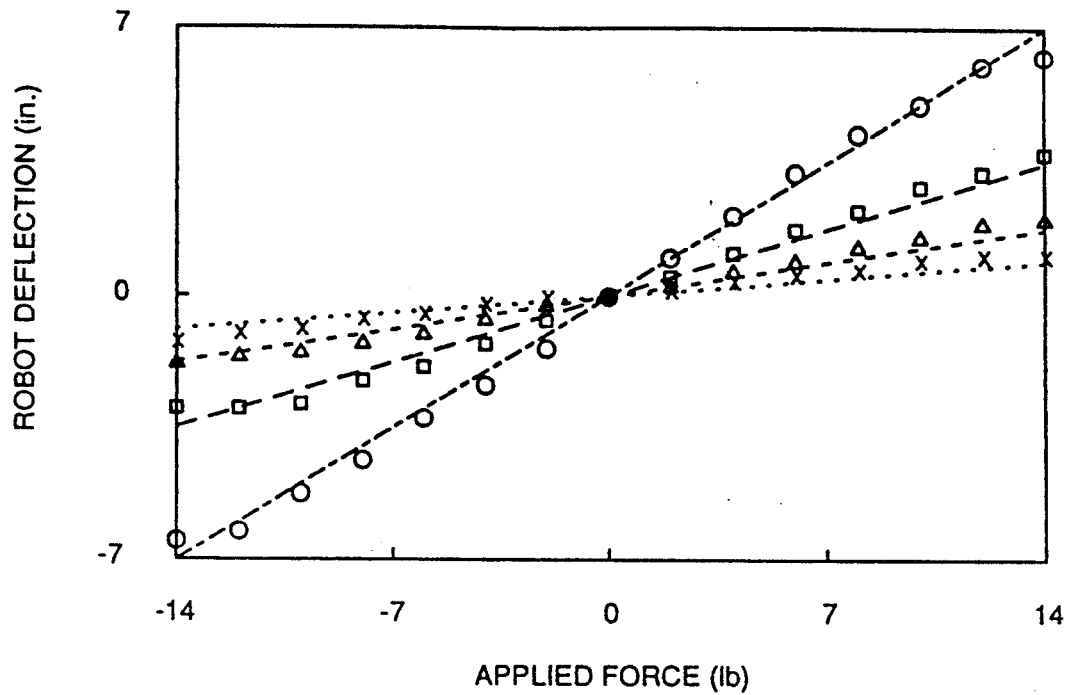
FIG. 10 is a graph which shows compliance measurements of the shared compliance control: robot hand position deflection vs. applied force to the robot hand for four compliance compensator feedback gains of $G_{cc}=1/16$ (x), ⅛ (triangle), ¼ (square) and ½ (circle) in/lb.
Figure 11:
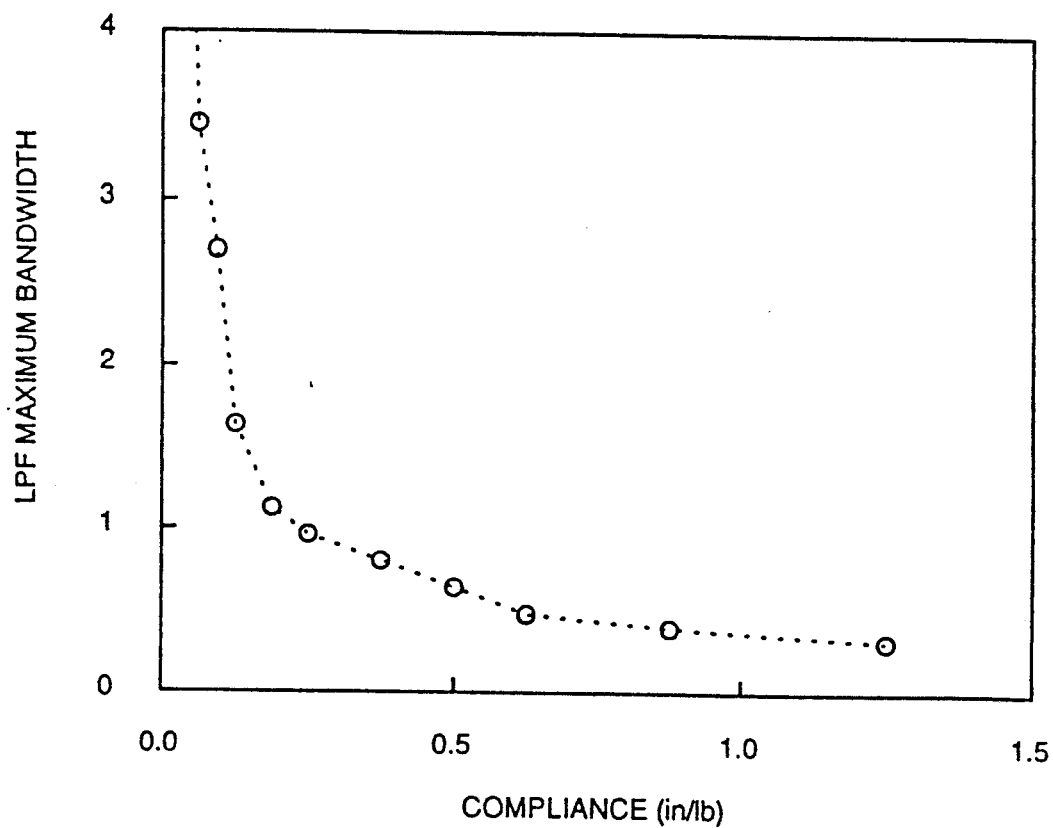
FIG. 11 is a graph which shows compliance value (compliance compensator feedback gain) measurements for the shared compliance control of FIG. 4.

Compliance measurements (robot hand deflection vs. applied force) of SCC of FIG. 4 were plotted in FIG. 10 for four compliance feedback gains, $G_{cc}=1/16$, ⅛, ¼, and ½ in/lb. The plots show that the new compliance value of the robot hand is approximately equal to the compliance compensator feedback gain $G_{cc}$. The measured compliance data also show excellent linearity in the robot work volume. In the SCC implementation, a low-pass filter is used to add damping to stabilize the system. A larger compliance means a higher compliance feedback gain ($G_{cc}$), which requires a lower bandwidth of the low-pass filter with a more sluggish compliant response. The maximum bandwidths of the low-pass filter for given desired. Compliance values were measured and plotted in FIG. 11. The maximum bandwidth of the low-pass filter is about 3.4 Hz for the compliance value of $G_{cc}=1/16$ in/lb (16 lb/in stiffness), 1.6 Hz for ⅛ in/lb, 0.8 Hz for ¼ in/lb, and 0.4 Hz for ½ in/lb. In the above measurements, compliance compensators were added only along translational axes not about rotational axes. When both were enabled, the maximum bandwidth values were reduced further approximately to a half.

Figure 12:
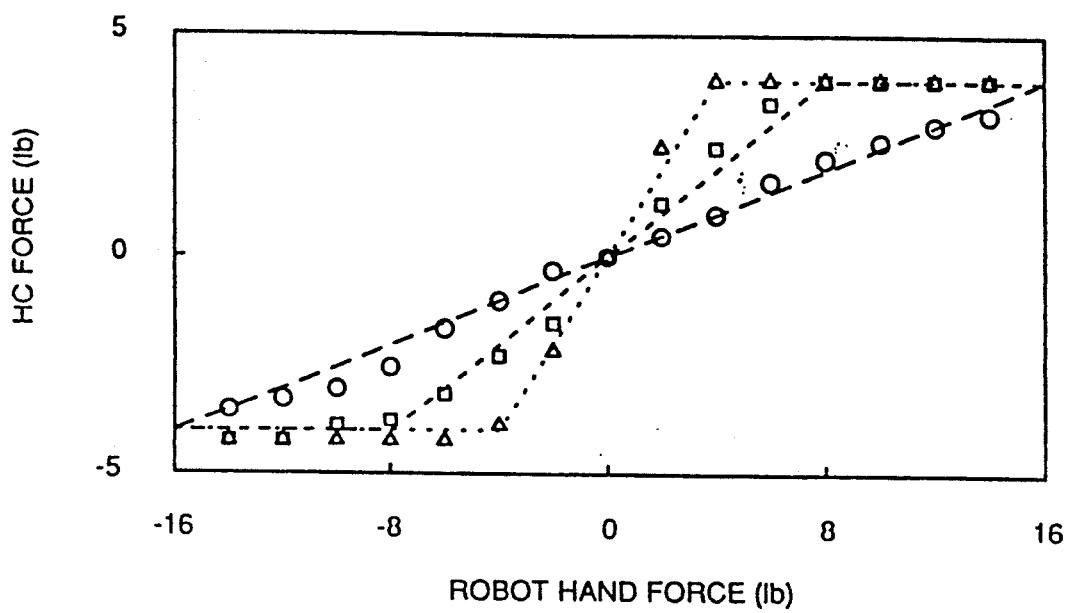
FIG. 12 is a graph which shows force reflection characteristics of the position-error-based force reflection combined with compliance control for the force reflection gains of ¼ (circle), ½ (square), and 1 (triangle).

The force reflection behaviors of the position-error-based force reflection scheme of FIG. 6 were measured (FIG. 12) for the three force reflection gains of $\frac{1}{4}$ ($G_{cc}=1/16$ in/lb), $\frac{1}{2}$ ($G_{cc}=\frac{1}{8}$ in/lb), and 1 ($G=\frac{1}{4}$ in/lb) with a fixed position error gain of $G_{pe}=4$ lb/in. Note that the force reflection gain in this scheme is given by $G_{pe}G_{cc}$. In FIG. 12, all three curves saturate at about 4 lb drive force, since the maximum drive force of the force reflecting hand controller is limited to about 4 lb as shown in FIG. 9. This limited drive force is probably a good feature since excessive force in the hand controller causes rapid operator fatigue.

Figure 13:
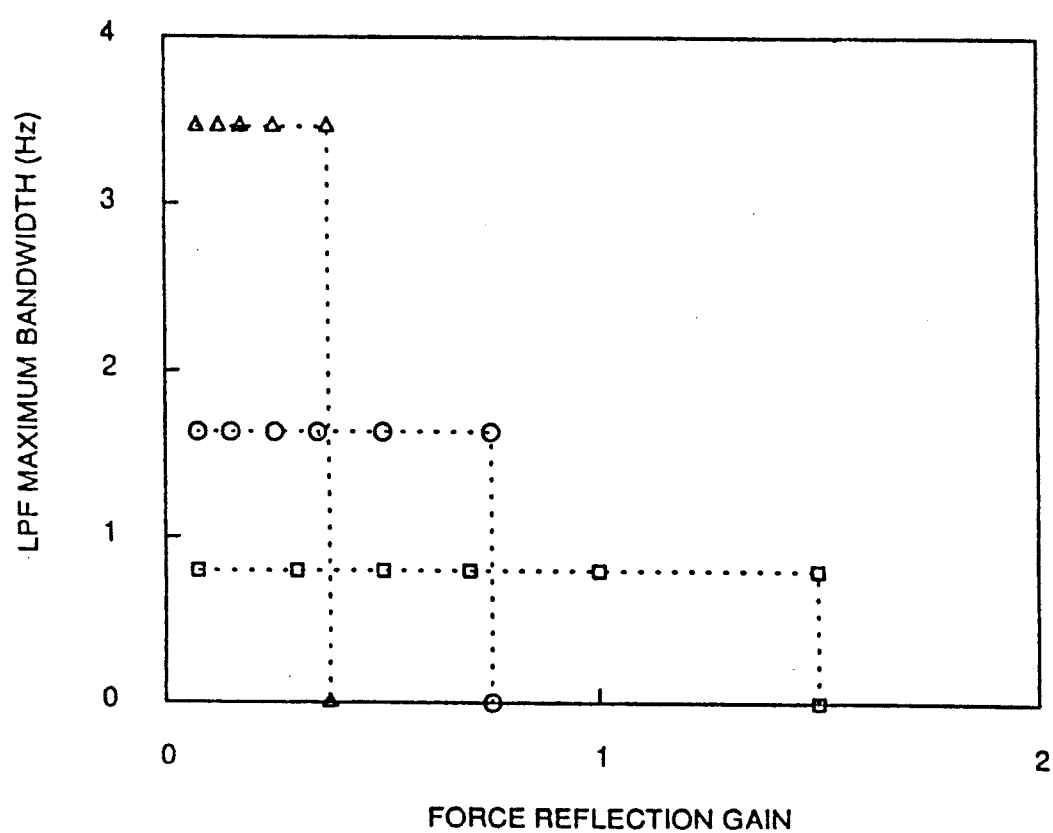
FIG. 13 is a graph which shows maximum bandwidth of the low-pass filter vs. force reflection gain measurements of the position-error-based force reflection with compliance control for three compliance values of 1/16 (triangle), ⅛ (circle), and ¼ (square) in/lb.

FIG. 13 is a plot showing the maximum bandwidth vs. the force reflection gain for the position-error-based force reflection with three different compliance values of the compliance compensator ($G_{cc}=1/16$, $\frac{1}{8}$, $\frac{1}{4}$ in/lb]. For a given compliance value, both the bandwidth and the force reflection gain are limited. It is interesting to observe the an abrupt oscillation occurs as soon as the force reflection gain exceeds a certain maximum value. In FIG. 13, the maximum bandwidths for the compensator compliance values of 1/16, $\frac{1}{8}$, $\frac{1}{4}$ in/lb are 3.4 Hz, 1.6 Hz, 0.8 Hz, respectively, and the maximum force reflections gains for the same compliance values are 0.375, 0.75, 1.5, respectively. These data indicate that the maximum bandwidth is inversely proportional to the compliance value, while the maximum force reflection gain is proportional to the compliance value. The maximum bandwidths are limited by the stability boundary of the compliance control feedback loop as described earlier (FIG. 11). The maximum force reflection gains are somewhat higher than expected from Equation (2), and a more careful stability analysis is in progress.

Figure 14:
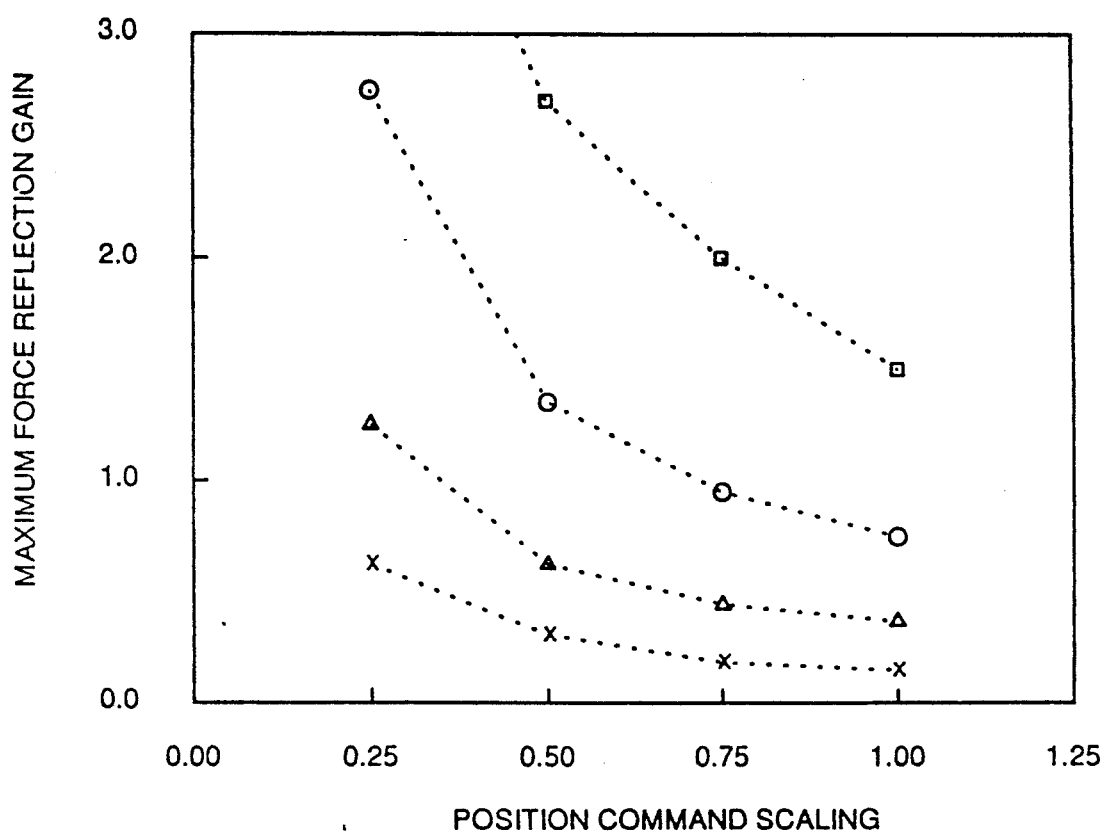
FIG. 14 is a graph which shows maximum force reflection gain vs. position scale factor measurements of the position-error-based force reflection with compliance control for four compliance values of O(x), 1/16 (triangle), ⅛ (circle), and ¼ (square) in/lb.

The maximum force reflection gains of the position-error-based force reflection with four different position scale factors ($G_{ps}=\frac{1}{4}$, $\frac{1}{2}$, $\frac{3}{4}$, 1) were measured and plotted in FIG. 14 for four different compliance values of the compliance compensator ($G_{cc}=0$, 1/16, $\frac{1}{8}$, $\frac{1}{4}$ in/lb). The maximum force reflection gain is inversely proportional to the position scale factor $G_{ps}$, which can be easily conjectured from Equation (2). It can be observed in FIG. 14 that the maximum force reflection gains are approximately doubled when the position scale factor is reduced to half, for example, from 1 to $\frac{1}{2}$. The position-error-based force reflection is possible without compliance control ($G_{cc}=0$) as seen in FIG. 14, but the maximum force reflection gain is limited to about 1/10 for the unity position scale factor.

Peg-in-Hole Experiments wt Different Operating Modes

Peg-in-hole tasks were performed with eight different operating modes to evaluate the position-error-based force reflection in comparison with other operating modes. A 7"×7" peg-in-hole task module mounted on the 21"×21" task board was used for the peg-in-hole task. The peg-in-hole task module has 9 holes arranged in a square matrix. In our experiments, only one hole with 10 mil clearance and no chamfer was used. The peg was 4.75" in length and 0.998" in diameter. The peg-in-hole task consisted of the following steps: i) the peg is initially located at about 2 inches in front of the designated hole of the peg-in-hole task module, ii) move the peg to the designated hole, iii) insert the peg into the hole completely, iv) extract the peg. In our advanced teleoperation setup, the hand controller of the master side was installed in the control station room separate from the PUMA arm of the slave side. Three television camera views of the task board and robots were provided in the control station: top, upper left, and upper right views of the task environment. The focus and zoom settings were fixed throughout the experiments. During the experiments, force/torque data of the robot hand were recorded to a hard disk at 100 Hz sampling rate through a parallel I/O port of an IBM computer.

The eight operating modes tested are: (mode 1) low-pass-filtered FR combined with SCC with the FR gain=$\frac{1}{2}$, (mode 2) position-error-based FR combined with SCC with the FR gain=$\frac{1}{2}$, (mode 3) low-pass-filtered FR combined with SCC with the FR gain=$\frac{1}{4}$, (mode 4) SCC only, (mode 5) damper only control with no active compliance, (mode 6) uncompensated pure FR with the FR gain 1/10, (mode 7) pure position control without FR or SCC, and (mode 8) rate control with SCC. For all position control modes of 1 through 7, the position scale factor is fixed to $G_{ps}=\frac{1}{2}$. The stiffness values (inverse of the compliance values) used for SCC were 6.7 lb/in (80.0 lb/ft) for Cartesian translations and 2.8 lb-in/deg (13.4 lb ft/rad) for Cartesian rotations. The low-pass filter bandwidths were 0.63 Hz for translations and 0.47 Hz for rotations. For simplicity, the same compliance and bandwidth values were used for all three Cartesian position axes and also for all three orientation axes, and no serious attempt was made to find the optimal parameter values.

In the experiments, test operators performed the peg-in-hole task three times each with the 8 operating modes in random order (24 tasks in total). Three test operators participated in the experiments. All operators first trained themselves until they could complete the peg-in-hole task comfortably for all operating modes. Then, each operator performed one complete set of the experiment of 24 peg-in-hole tasks as a practice run. Thereafter, actual experiment was performed for experimental data collection.

Figure 15:
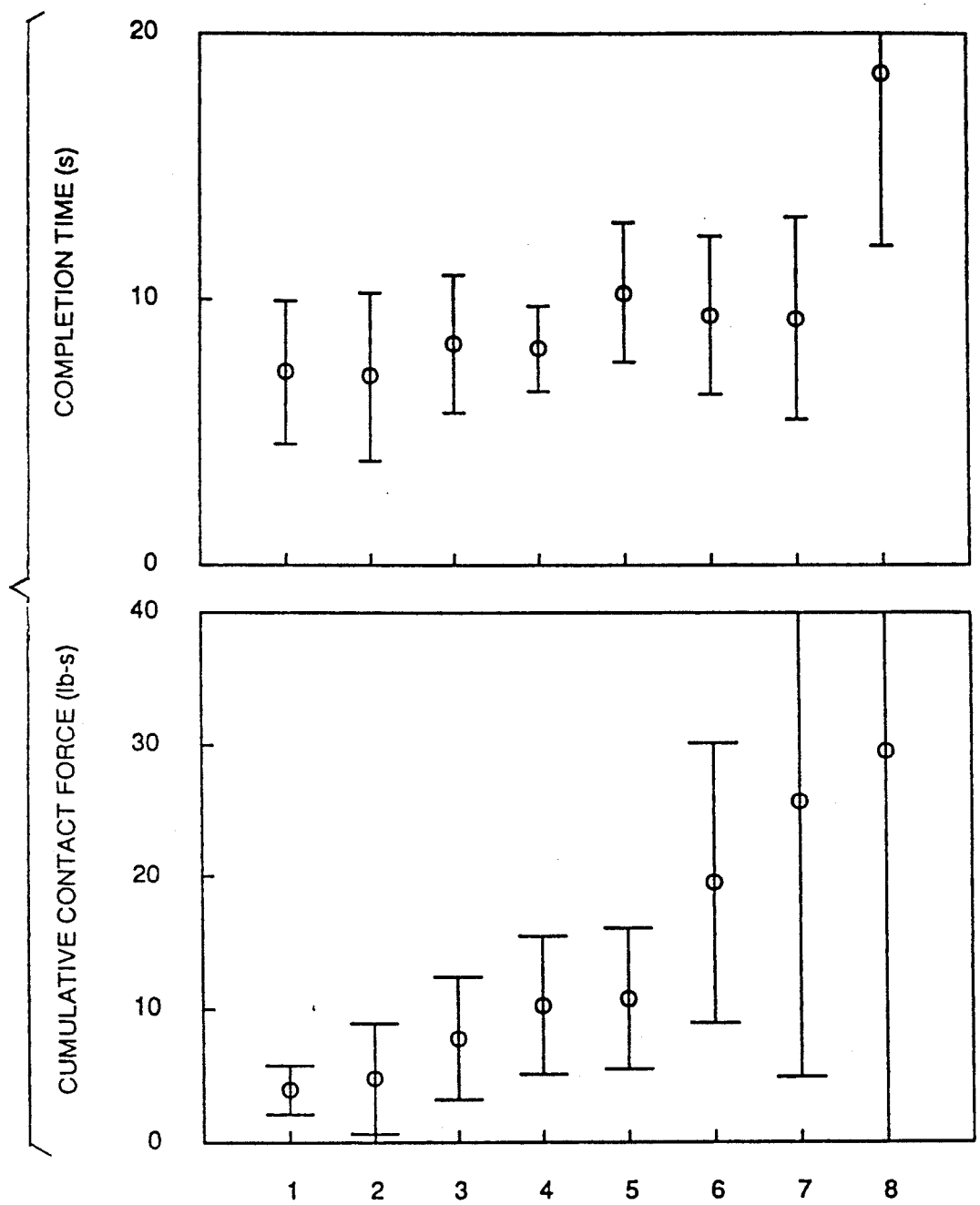
FIG. 15 illustrates plots of completion time and cumulative contact force data obtained from the peg-in-hole experiment with eight different operating modes. Newly developed schemes (first three operation modes) demonstrate the best task performances.

Task completion times and cumulative contact forces were computed from the contact force/torque data recorded during the experiment and the means and standard deviations of the three test operators' data are plotted in FIG. 15. From FIG. 15 we can observe that completion times are similar for all position control modes, but contact forces are greatly reduced with the use of SCC and/or FR. Performance with position control (modes 1 through 7) is superior to that with rate control. The best task performances resulted with our newly developed schemes—position-error-based FR with SCC and low-pass-filtered FR with SCC. Both schemes combine FR and SCC and enable high force reflection with limited bandwidths. Due to limited bandwidth, operators felt force reflection sluggishness during the peg-in-hole task execution. Some operators felt more comfortable with a reduced force reflection gain of $\frac{1}{4}$ compared to $\frac{1}{2}$, although the task performance was better with the force reflection gain of $\frac{1}{2}$ in terms of cumulative contact force as shown in FIG. 15. Performance with SCC only or damper only was superior to that with uncompensated pure force reflection (force reflection gain=1/10) as seen in FIG. 15. Low-pass-filtered FR alone without SCC was marginally operational, requiring the operator to maintain a very firm grasp during the peg-in-hole task performance, and thus was not included in our experiment.

Recently, more thorough experiments with a screw insertion/removal task were performed with seven test operators to compare various control modes. Again the newly developed position-error-based force reflection combined with compliance control resulted in the best task performance among all control modes tested.

Conclusion

Two novel schemes of force reflecting control have been presented, namely position-error-based force reflection and low-pass-filtered force reflection, both combined with shared compliance control, for dissimilar master-slave arms. These new schemes enabled high force reflection gains, up to about 2 for the unity position scaling, which were not possible with a conventional scheme when the slave arm with a limited dynamics bandwidth is much stiffer than the master arm. The experimental results with a peg-in-hole task indicate that the newly developed force reflecting control schemes combined with compliance control resulted in best task performances.

I claim:

1. In a system for teleoperation of a robot arm providing an operator with force reflection through a force-reflecting hand controller in combination with a shared compliance control for each Cartesian coordinate axis of the teleoperation system, a force-reflecting control architecture combined with shared compliance control architecture in one system comprising, means for transmitting from said hand controller a commanded position signal, HC, with gain, $G_{ps}$, a robot servo system at said robot arm responsive to a servo control input signal for driving said robot arm to an actual commanded position, and producing a signal representative of actual position of said robot arm, a signal mixer coupling said servo control input signal for a commanded position to said robot servo system, said signal mixer modifying said servo control input signal in response to a low-pass filtered contact force signal to produce an actual servo control signal that is a function of the difference between said servo control input signal and said low-pass filtered contact force signal with compliance control feedback gain, $G_{cc}$, for actual positioning of said robot arm, means for sensing contact force generated by said actual positioning of said robot arm for producing a contact force signal proportional to a force of reaction due to contact or torque when said arm is in contact with an object, a low-pass filter coupling said contact force signal to said mixer with said compliance control feedback gain as said low-pass filtered contact signal, means for producing a force reflection signal that is a function of said commanded position signal, HC, with gain $G_{ps}$, transmitted to said robot arm and a selected one of two signals, namely a signal representing actual position of said robot arm effected by said robot servo control signal, and said force contact signal without compliance control feedback gain, $G_{cc}$, and means for transmitting said force reflection signal to said hand controller, whereby said operator responds to said force reflection hand controller for producing a following commanded position signal for transmittal to said robot servo system.

2. A system as defined in claim 1 wherein said means for producing said force reflection signal produces a signal proportional to the difference between said actual robot position signal and said commanded position signal, HC, transmitted with gain, $G_{ps}$, by said hand controller.

3. A system as defined in claim 1 wherein said means for producing said force reflection signal produces a signal proportional to the difference between said servo control input signal from said signal mixer and said commanded position signal transmitted to said mixer by said hand controller.

4. A system as defined in claim 1 wherein said force reflection signal comprises said contact force signal, which is itself a function of said commanded position signal, filtered by said low-pass filter without said position signal, filtered by said low-pass filter without said gain, $G_{ps}$.

* * * * *